United States Patent Office 3,518,278
Patented June 30, 1970

3,518,278
SUBSTITUTED-1,2,3,4-TETRAHYDROBENZO-
THIENO 2,3-PYRIDINE
John T. Suh, Mequon, Wis., assignor to Colgate-Palmolive Company, New York, N.Y., a corporation of Delaware
No Drawing. Continuation-in-part of application Ser. No. 705,909, Feb. 16, 1968, which is a continuation-in-part of application Ser. No. 621,475, Mar. 8, 1967. This application Mar. 20, 1969, Ser. No. 809,003
Int. Cl. C07d 31/50
U.S. Cl. 260—294.8
6 Claims

ABSTRACT OF THE DISCLOSURE

The compounds are substituted-1,2,3,4-tetrahydrobenzothieno[2,3-c]pyridine useful as central nervous system depressants and tranquilizing agents. A compound disclosed is 6-chloro - 1,2,3,4 - tetrahydrobenzothieno[2,3-c]pyridine.

RELATED CASES

The present application is a continuation-in-part of my copending application Ser. No. 705,909 filed Feb. 16, 1968, which is in turn a continuation-in-part of my earlier application Ser. No. 621,475 filed Mar. 8, 1967, now abandoned.

DETAILED DESCRIPTION

The compounds of the present invention have the following formula:

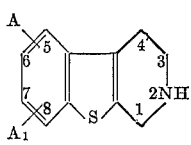

Formula I wherein A and $A_1$ are selected from hydrogen, hydroxy, nitro, lower alkyl groups of 1 to 4 carbon atoms such as methyl, ethyl or isopropyl, lower alkoxy groups such as methoxy, ethoxy and propoxy, fluoro, chloro, bromo, iodo and trifluoromethyl, provided that A and $A_1$ are not both hydrogen.

The basic starting materials employed in the preparation of the compounds of the present invention are β-(3-thianaphthenyl)ethylamines of the formula

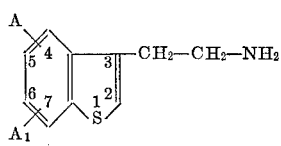

Formula II in which A and $A_1$ are as previously defined. The ethylamines may be prepared from the corresponding cyano compounds as described in the literature (Herz J.A.C.S. 72, p. 4999 (1950) and Pat. No. 855,115).

The ethylamine starting materials may also be prepared by treating the corresponding acid with thionyl chloride followed by treatment with sodium azide and acid hydrolysis. The process may be illustrated as follows:

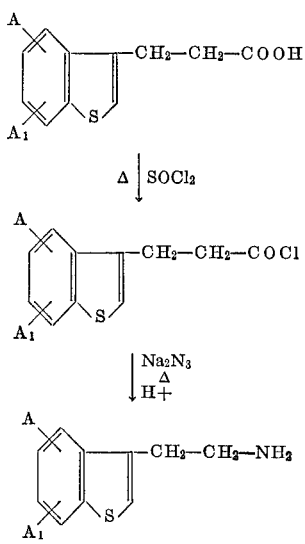

wherein A and $A_1$ are as previously described.

Representative of the amines which may be used as starting materials are the following compounds:

β-[3-(5-fluoro)-thianaphthenyl]ethylamine,
β-[3-(6-fluoro)-thianaphthenyl]ethylamine,
β-[3-(4-fluoro)-thianaphthenyl]ethylamine,
β-[3-(7-fluoro)-thianaphthenyl]ethylamine,
β-[3-(5-chloro)-thianaphthenyl]ethylamine,
β-[3-(6-chloro)-thianaphthenyl]ethylamine,
β-[3-(4-chloro)-thianaphthenyl]ethylamine,
β-[3-(7-chloro)-thianaphthenyl]ethylamine,
β-[3-(5-trifluoromethyl)thianaphthenyl]ethylamine,
β-[3-(6-trifluoromethyl)-thianaphthenyl]ethylamine,
β-[3-(4-trifluoromethyl)-thianaphthenyl]ethylamine,
β-[3-(7-trifluoromethyl)-thianaphthenyl]ethylamine,
β-[3-(5,6-dimethoxy)-thianaphthenyl]ethylamine,
β-[3-(5-methoxy)-thianaphthenyl]ethylamine,
β-[3-(6-methoxy)-thianaphthenyl]ethylamine,
β-[3-(4-methoxy)-thianaphthenyl]ethylamine,
β-[3-(7-methoxy)-thianaphthenyl]ethylamine,
β-[3-(5-hydroxy)-thianaphthenyl]ethylamine,
β-[3-(6-hydroxy)-thianaphthenyl]ethylamine,
β-[3-(5,6-hydroxy)-thianaphthenyl]ethylamine,
β-[3-(5-bromo)-thianaphthenyl]ethylamine,
β-[3-(6-bromo)-thianaphthenyl]ethylamine,
β-[3-(5-iodo)-thianaphthenyl]ethylamine, and
β-[3-(6-iodo)-thianaphthenyl]ethylamine.

The compounds of the present invention may be conveniently prepared by several methods. In the preferred practice of the invention they are prepared by treating the desired ethylamine with paraformaldehyde at a temperature of about 20° to 100° for one to two hours. The compounds may also be prepared by reducing the corresponding lactam with lithium aluminum hydride or another suitable chemical reducing agent. The process may be diagrammed as follows:

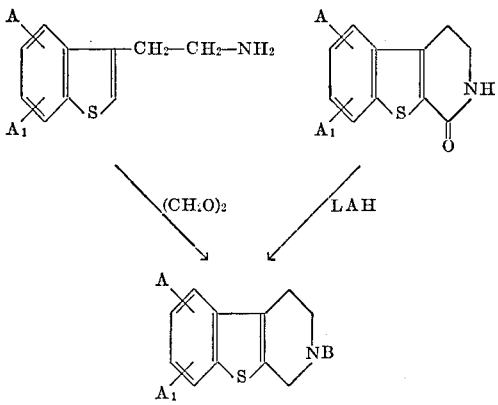

in which A and $A_1$ are as previously described.

Representative of the compounds which may be prepared by the described processes are the following:

6-fluoro-1,2,3,4-tetrahydrobenzothieno[2,3-c]pyridine,
7-fluoro-1,2,3,4-tetrahydrobenzothieno[2,3-c]pyridine,
5-fluoro-1,2,3,4-tetrahydrobenzothieno[2,3-c]pyridine,
8-fluoro-1,2,3,4-tetrahydrobenzothieno[2,3-c]pyridine,
6-chloro-1,2,3,4-tetrahydrobenzothieno[2,3-c]pyridine,
7-chloro-1,2,3,4-tetrahydrobenzothieno[2,3-c]pyridine,
5-chloro-1,2,3,4-tetrahydrobenzothieno[2,3-c]pyridine,
8-chloro-1,2,3,4-tetrahydrobenzothieno[2,2-c]pyridine,
6-trifluoromethyl-1,2,3,4-tetrahydrobenzothieno-
 [2,3-c]pyridine,
7-trifluoromethyl-1,2,3,4-tetrahydrobenzothieno-
 [2,3-c]pyridine,
5-trifluoromethyl-1,2,3,4-tetrahydrobenzothieno-
 [2,3-c]pyridine,
8-trifluoromethyl-1,2,3,4-tetrahydrobenzothieno-
 [2,3-c]pyridine,
6,7-dimethoxy-1,2,3,4-tetrahydrobenzothieno-
 [2,3-c]pyridine,
6-methoxy-1,2,3,4-tetrahydrobenzothieno-
 [2,3-c]pyridine,
7-trifluoromethyl-1,2,4-tetrahydrobenzothieno-
 [2,3-c]pyridine,
5-methoxy-1,2,3,4-tetrahydrozenzothieno-
 [2,3-c]pyridine,
8-methoxy-1,2,3,4-tetrahydrobenzothieno-
 [2,3-c]pyridine,
6-hydroxy-1,2,3,4-tetrahydrobenzothieno-
 [2,3-c]pyridine,
7-hydroxy-1,2,3,4-tetrahydrobenzothieno-
 [2,3-c]pyridine,
6,7-dihydroxy-1,2,3,4-tetrahydrobenzothieno-
 [2,3-c]pyridine,
6-bromo-1,2,3,4-tetrahydrobenzothieno[2,3-c]pyridine,
7-bromo-1,2,3,4-tetrahydrobenzothieno[2,3-c]pyridine,
6-iodo-1,2,3,4-tetrahydrobenzothieno[2,3-c]pyridine, and
7-iodo-1,2,3,4-tetrahydrobenzotheno[2,3-c]pyridine.

Acid addition salts of the compounds of the present invention may be prepared by contacting the compounds with a suitable acid such as formic acid, citric acid, maleic acid, sulphuric acid, hydrochloric acid, succinic acid, tartaric acid, benzoic acid or fumaric acid.

The compounds of the present invention are useful as intermediates in the preparation of more complex chemical and pharmaceutical compounds. In addition, because of their antipsychotic properties, they are useful as pharmaceutical agents, per se. In animal tests the compounds have demonstrated an ability to control antisocial aggressive behavior. For example, the compound 6 - chloro - 1,2,3,4-tetrahydrobenzothieno[2,3-c]pyridine, which is representative of the class, has shown at a safe and effective dose of approximately 5 mg./kg. intraperitoneally, an ability to diminish or inhibit the antisocial behavior characteristics such as aggression, viciousness and persistence for fighting which is normally induced by isolation in mice. The compound was also found to have an $LD_{50}$ in mice in excess of 100 mg./kg. intraperitoneally in behavior studies conducted in the manner outlined by Irwin in "Animal and Clinical Pharmacologic Techniques in Drug Evaluation," J. H. Nodine and P. E. Siegler, ed., Year Book Publishers, Inc. 1964, pp. 36–54.

When intended for use as pharmaceuticals the compounds are preferably employed in the form of their acid addition salt and are combined with a major amount of one or more suitable pharmaceutical diluents or additives and formed into unit dosage forms, such as capsules or tablets for oral administration or sterile solutions for parenteral administration. The unit dosage forms will generally contain a concentration of 0.1% to 10% or more by weight of one or more of the novel compounds. Generally such dosage forms will contain about 5 to 250 mg. of the active ingredients. One or more of such dosage forms may be administered daily; however, the amount administered will not normally exceed 100 mg./kg. of body weight of the intended recipient.

A typical tablet may have the following composition:

|  | Mg. |
|---|---|
| (1) 6 - chloro - 1,2,3,4 - tetrahydrobenzothieno[2,3-c]pyridine | 20 |
| (2) Starch U.S.P. | 52 |
| (3) Lactose U.S.P. | 68 |
| (4) Talc U.S.P. | 9 |
| (5) Stearic acid | 6 |

Powders 1, 2 and 3 are slugged, then granulated, mixed with 4 and 5 and tableted.

A suitable capsule might be obtained by filling a No. 3 hard gelatin capsule with a mixture of the following ingredients:

|  | Mg. |
|---|---|
| (1) 6 - chloro - 1,2,3,4 - tetrahydrobenzothieno[2,3-c]pyridine | 10 |
| (2) Lactose U.S.P. | 195 |
| (3) Starch U.S.P. | 16 |
| (4) Talc U.S.P. | 8 |

The following examples are presented to illustrate the invention:

EXAMPLE 1

α-(5-chloro-3-thianaphthenylmethyl)malonic acid

To a solution of 45.2 g. of KOH in 45 ml. of water is added 100 ml. of ethanol and 45.2 g. (0.13 mole) of diethyl α-(5-chloro-3-thianaphthenylmethyl)malonate and the mixture is refluxed 22 hours. The alcohol is removed in vacuo after which 200 ml. of water is added and the mixture extracted twice with 100 ml. portions of ether. The aqueous solution is treated with activated charcoal, acidified with concentrated HCl and cooled. The solids are collected and dried to yield α-(5-chloro-3-thianaphthenylmethyl)malonic acid in the form of a yellow solid, M.P. 175–177°.

Analysis.—Calcd. for $C_{12}H_9ClO_4S$ (percent): S, 11.26. Found (percent): S, 11.42.

EXAMPLE 2

β-(5-chloro-3-thianaphthenyl)propionic acid

α - (5-chloro - 3 - thianaphthenylmethyl)malonic acid (13.5 g., 0.048 mole) is heated at 190–195° for two hours. It is cooled to 25° and 75 ml. are dissolved. It is cooled, extracted twice with 35 ml. of chloroform, treated with activated charcoal and acidified with 10% HCl solution. The solids are collected, washed and dried to yield β-(5-chloro-3-thianaphthenyl)propionic acid. An analytical sample is prepared by recrystallizing twice from ethanol and twice from methanol to yield β-(5-chloro-3-thianaphthenyl)propionic acid in the form of a yellow solid, M.P. 187–189°.

*Analysis.*—Calcd. for $C_{11}H_9ClO_2S$ (percent): C, 54.91; H, 3.77; Cl, 14.74; S, 13.32. Found (percent): C, 55.09; H, 3.79; Cl, 14.83; S, 13.27.

EXAMPLE 3

β-(5-chloro-3-thianaphthenyl)ethylamine hydrochloride

A mixture of 26.8 g. (0.11 mole) of α-(5-chloro-3-thianaphthene)propionic acid and 57 g. (35 ml., 0.48 mole) of $SOCl_2$ is heated to 50° in 0.5 hour and maintained at 50–52° for 1 hour. The excess $SOCl_2$ is removed in vacuo. Benzene (50 ml.) is added to the residue and concentrated to yield β(5 - chloro-3-thianaphthenyl)propionyl chloride in the form of a yellow solid.

A mixture of 32 g. (0.12 mole) of β-(5-chloro-3-thianaphthenyl)propionyl chloride and 34 g. (0.51 mole) of $NaN_3$ in 200 ml. of toluene is refluxed for 23.5 hours. The mixture is cooled, filtered and the filtrate concentrated to yield a brown oil.

To the above oil is added 100 ml. of concentrated HCl with stirring at 25° for 15 minutes, at 80° for 0.5 hour after which it is refluxed for 6 hours. The mixture is cooled to 25° and 100 ml. of ether added and stirred 0.5 hour. The solids are collected, washed with ether and dried to yield a solid, M.P. 215–237°. An analytical sample is prepared by recrystallizing from activated charcoal-treated ethanol to yield β-(5-chloro - 3 - thianaphthenyl)ethylamine hydrochloride in the form of a white solid, M.P. 248–250°.

*Analysis.*—Calcd. for $C_{10}H_{11}Cl_2NS$ (percent): C, 48.38; H, 4.47; N, 5.64; S, 12.91. Found (percent): C, 48.18; H, 4.64; N, 5.48; S, 13.02.

EXAMPLE 4

6-chloro-1,2,3,4-tetrahydrobenzothieno[2,3-c]pyridine

To a mixture of 2.39 g. (0.0113 mole) of β-[3-(5-chloro)thianaphthenyl]ethylamine in 10 ml. of water is added slowly 1.3 ml. of concentrated HCl. The solution is heated to 80° and 0.39 g. (0.0129 mole) of paraformaldehyde added in one portion after which heating continued for 1.25 hours at 80–90°. The mixture is cooled to 21°, basified with 10% NaOH solution and extracted twice with 75 ml. portions of ether. The combined extracts are washed with brine, dried, and concentrated to yield a solid which is recrystallized twice from activated charcoal-treated 2-propanol to yield 6 - chloro - 1,2,3,4-tetrahydrobenzothieno[2,3-c]pyridine as white needles, M.P. 99–100°.

*Analysis.*—Calcd. for $C_{11}H_{10}ClNS$ (percent): C, 59.06; H, 4.51; N, 6.25; S, 14.34.

EXAMPLE 5

When, in the procedure of Example 4, β-[3-(5-chloro) thianaphthenyl]ethylamine is replaced by an equal molar amount of β-[3-(5-fluoro)-thianaphthenyl]ethylamine,
β-[3-(6-fluoro)-thianaphthenyl]ethylamine,
β-[3-(4-fluoro)-thianaphthenyl]ethylamine,
β-]3-(7-fluoro)-thianaphthenyl]ethylamine,
β-[3-(5-chloro)-thianaphthenyl]ethylamine,
β-[3-(6-chloro)-thianaphthenyl]ethylamine,
β-[3-(4-chloro)-thianaphthenyl]ethylamine,
β-[3-(7-chloro)-thianaphthenyl]ethylamine,
β-[3-(5-trifluoromethyl)-thianaphthenyl]ethylamine,
β-[3-(6-trifluoromethyl)-thianaphthenyl]ethylamine,
β-[3-(4-trifluoromethyl)-thianaphthenyl]ethylamine,
β-[3-(7-trifluoromethyl)-thianaphthenyl]ethylamine,
β-[3-(5,6-dimethoxy)-thianaphthenyl]ethylamine,
β-[3-(5-methoxy)-thianaphthenyl]ethylamine,
β-[3-(6-methoxy)-thianaphthenyl]ethylamine,
β-[3-(4-methoxy)-thianaphthenyl]ethylamine,
β-[3-(7-methoxy)-thianaphthenyl]ethylamine,
β-[3-(5-hydroxy)-thianaphthenyl]ethylamine,
β-[3-(6-hydroxy)-thianaphthenyl]ethylamine,
β-[3-(5,6-hydroxy)-thianaphthenyl]ethylamine,
β-[3-(5-bromo)-thianaphthenyl]ethylamine,
β-[3-(6-bromo)-thianaphthenyl]ethylamine,
β-[3-(5-iodo)-thianaphthenyl]ethylamine, and
β-[3-(6-iodo)-thianaphthenyl]ethylamine, respectively there are obtained, 6-fluoro-1,2,3,4-tetrahydrobenzothieno[2,3-c]pyridine,
7-fluoro-1,2,3,4-tetrahydrobenzothieno[2,3-c]pyridine,
5-fluoro-1,2,3,4-tetrahydrobenzothieno[2,3-c]pyridine,
8-fluoro-1,2,3,4-tetrahydrobenzothieno[2,3-c]pyridine,
6-chloro-1,2,3,4-tetrahydrobenzothieno[2,3-c]pyridine,
7-chloro-1,2,3,4-tetrahydrobenzothieno[2,3-c]pyridine,
5-chloro-1,2,3,4-tetrahydrobenzothieno[2,3-c]pyridine,
8-chloro-1,2,3,4-tetrahydrobenzothieno[2,3-c]pyridine,
6-trifluoromethyl-1,2,3,4-tetrahydrobenzothieno[2,3-c] pyridine,
7-trifluoromethyl-1,2,3,4-tetrahydrobenzothieno[2,3-c] pyridine,
5-trifluoromethyl-1,2,3,4-tetrahydrobenzothieno[2,3-c] pyridine,
8-trifluoromethyl-1,2,3,4-tetrahydrobenzothieno[2,3-c] pyridine,
6,7-dimethoxy-1,2,3,4-tetrahydrobenzothieno[2,3-c] pyridine,
6-methoxy-1,2,3,4-tetrahydrobenzothieno[2,3-c]pyridene,
7-methoxy-1,2,3,4-tetrahydrobenzothieno[2,3-c]pyridine,
5-methoxy-1,2,3,4-tetrahydrobenzothieno[2,3-c]pyridine,
8-methoxy-1,2,3,4-tetrahydrobenzothieno[2,3-c]pyridine,
6-hydroxy-1,2,3,4-tetrahydrobenzothieno[2,3-c]pyridine,
7-hydroxy-1,2,3,4-tetrahydrobenzothieno[2,3-c]pyridine,
6,7-dihydroxy-1,2,3,4-tetrahydrobenzothieno[2,3-c] pyridine,
6-bromo-1,2,3,4-tetrahydrobenzothieno[2,3-c]pyridine,
7-bromo-1,2,3,4-tetrahydrobenzothieno[2,3-c]pyridine,
6-iodo-1,2,3,4-tetrahydrobenzothieno[2,3-c]pyridine, and
7-iodo-1,2,3,4-tetrahydrobenzothieno[2,3-c]pyridine, respectively.

I claim:
1. A compound selected from the group consisting of a compound of the formula

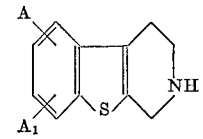

wherein A and $A_1$ are selected from hydrogen, hydroxy, lower alkyl of 1 to 4 carbon atoms, lower alkoxy, fluoro, chloro, bromo, iodo and trifluoromethyl, provided that A and $A_1$ are not both hydrogen, and the pharmaceutically acceptable acid addition salts thereof.

2. A compound of claim 1 in which A and $A_1$ are selected from fluoro, chloro and trifluoromethyl.

3. A compound of claim 1 in which A is hydrogen and $A_1$ is selected from chloro, fluoro and trifluoromethyl.

4. A compound of claim 1 in which A is hydrogen and $A_1$ is selected from alkoxy and hydroxy.

5. A compound of claim 1 in which A and $A_1$ are both hydroxy or alkoxy.

6. A compound of claim 1 in which A is hydrogen and $A_1$ is chloro.

References Cited

Capps et al., J. Am. Chem., Soc., vol. 75, pp. 697–699, 1953.

Kotake et al., Chemical Abstracts, vol. 46, col. 6121-b, 1952.

HENRY R. JILES, Primary Examiner

A. L. ROTMAN, Assistant Examiner

U.S. Cl. X.R.

260—294.8, 330.5; 424—263

UNITED STATES PATENT OFFICE
CERTIFICATE OF CORRECTION

Patent No. 3,523,973                          Dated July 21, 1970

Inventor(s) John T. Suh

It is certified that error appears in the above-identified patent and that said Letters Patent are hereby corrected as shown below:

Column 1, line 2 - "Thieno 2,3-Pyridine" should read

-- Thieno[2,3-c]Pyridine --.

Column 3, lines 14 to 19 - " 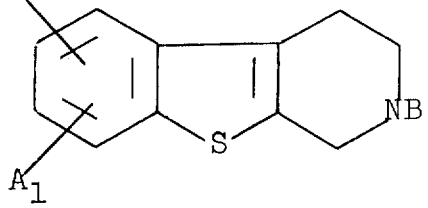 "

should read -- [structure with NH] --

Column 3, line 44 - "7-trifluoromethyl-1,2,3-tetrahydrobenzo-thieno-" should read -- 7-methoxy-1,2,3,4-tetrahydrobenzo-thieno- --.

SIGNED AND SEALED

OCT 20 1970

(SEAL)
Attest:

Edward M. Fletcher, Jr.
Attesting Officer

WILLIAM E. SCHUYLER, JR.
Commissioner of Patents